United States Patent [19]
Kobayashi et al.

[11] 4,324,615
[45] Apr. 13, 1982

[54] CONSTRUCTION OF NUCLEAR REACTOR CORE

[75] Inventors: Yasuhiro Kobayashi, Hitachi; Renzo Takeda, Yokohama, both of Japan

[73] Assignee: Hitachi, Ltd., Tokyo, Japan

[21] Appl. No.: 98,633

[22] Filed: Nov. 29, 1979

[30] Foreign Application Priority Data

Nov. 29, 1978 [JP] Japan .............................. 53-146538

[51] Int. Cl.³ .............................................. G21C 19/20
[52] U.S. Cl. ............................ 376/267; 376/419; 376/435
[58] Field of Search .............. 176/30, 17, 93 BP, 94, 176/87, 22

[56] References Cited

U.S. PATENT DOCUMENTS

| | | | |
|---|---|---|---|
| 3,799,839 | 3/1974 | Fischer | 176/22 |
| 3,801,443 | 4/1974 | Yasukawa | 176/30 |
| 3,986,924 | 10/1976 | Motoda | 176/17 |

*Primary Examiner*—Donald P. Walsh
*Attorney, Agent, or Firm*—Craig and Antonelli

[57] ABSTRACT

There is provided a novel initial core arrangement of a nuclear reactor. The fuel assemblies in the central region of the reactor core occupying more than 50% of the total area of the reactor core are grouped into a plurality of fuel units each of which being constituted by four adjacent fuel assemblies. The fuel assemblies in each fuel unit are replaced one by one at each fuel replacement cycle with a new fuel assembly. The initial core is so arranged that each fuel unit has one gadolinia containing high enrichment fuel assembly and three low enrichment fuel assemblies containing no gadolinea. This arrangement permits a stable reactor operation substantially equivalent to that obtained in the state of equilibrium (equilibrium core), even with an initial core.

7 Claims, 28 Drawing Figures

F I G. 10
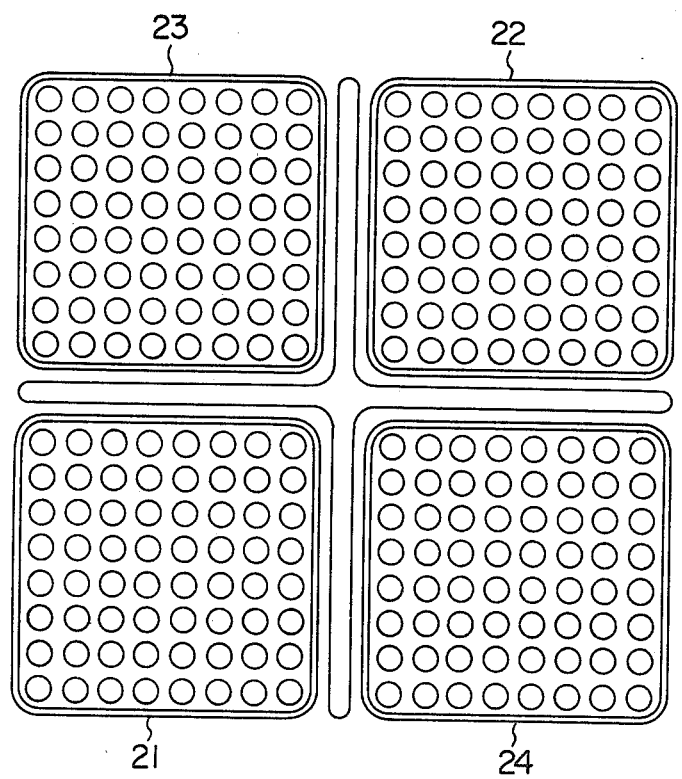

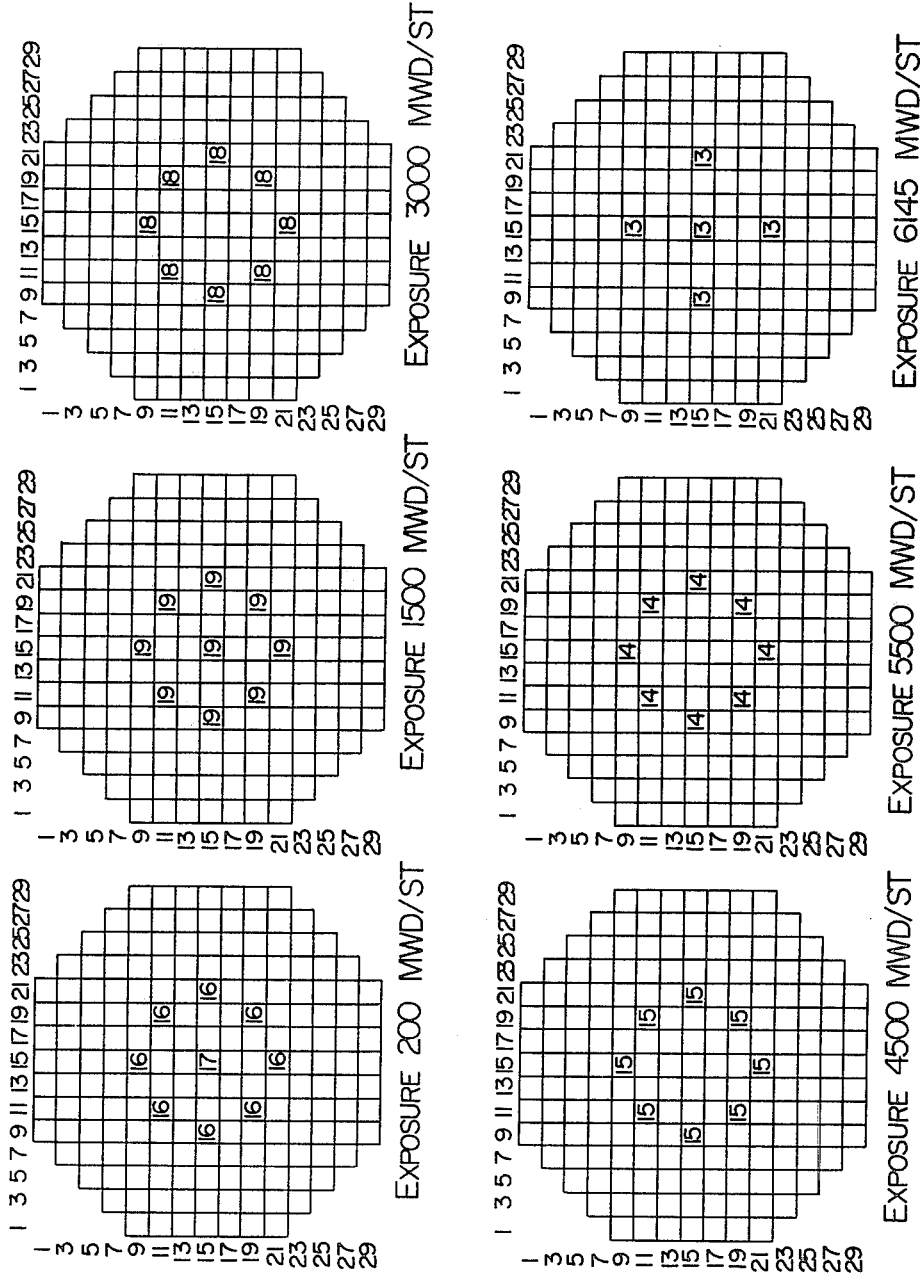
F I G. 23

CONSTRUCTION OF NUCLEAR REACTOR CORE

BACKGROUND OF THE INVENTION

The present invention relates to a reactor core arrangement and, more particularly, to an improvement in the fuel assembly arrangement in the reactor core of a boiling water reactor.

In the conventional boiling water reactor (BWR), the control of excess reactivity, as well as the control of distribution of power, is made by changing the insertion degree of control rods, the flow rate of the coolant and the amount of burnable poison contained in the fissionable material.

A control rod operation for changing the insertion degree of the control rods is liable to incur a drastic change in the power peaking which in turn causes a breakdown of the fuel rods. Therefore, it is current practice when the control rods are operated to previously lower the power of the reactor down to 20%, or so, of the rated power, by adjusting the flow rate of the coolant flowing through the reactor core, in order to avoid drastic changes of power peaking. Thus, lowering of the reactor output is necessary at each time of operation of the control rod. For this reason, the plant capacity factor of the nuclear reactor is considerably lowered, particularly when the frequency of control rod operation is high.

It is, therefore, a better strategy to eliminate the control rod operation for control of excess reactivity and power distribution.

Under these circumstances an acceptable measure is to control excess reactivity by adjusting the amount of burnable poison, which is a neutron absorbent, contained in the fuel in the reactor core. Namely, it is possible, by a use of the burnable poison, to minimize the requirement of mechanical control rod operation, thereby to increase the plant capacity factor of a nuclear reactor. Further, it is possible to control power distribution in the core by suitably distributing a burnable poison in the reactor core.

The specification of U.S. Pat. Application Ser. No. 936,133 discloses a fuel assembly containing burnable poison, having a plurality of fuel rods containing burnable poison.

This fuel assembly is constituted by a plurality of groups of fuel rods, some of the groups having fuel rods containing a burnable poison. According to this U.S. Patent Application, the groups of fuel assemblies placed within the 50% central area of the reactor core are regarded as being constituted by a plurality of units, each unit including four fuel assemblies. Each time there is a replacement of fuel, one of four fuel assemblies of each unit is replaced with a fuel assembly containing a burnable poison, thereby permitting easy control of excess reactivity, as well as power distribution, in a minimized control rod operation. The method disclosed in the above-mentioned specification also makes it possible to minimize the troublesome shuffling of the fuel assemblies required in the fuel replacement.

A similar fuel assembly containing burnable poison is disclosed also in the specification of the U.S. Pat. Application Ser. No. 942,555. In this fuel assembly, the ratio of the poison-containing fuel rods to all fuel rods of each fuel assembly is so selected that the burnable poison in the fuel assembly is exhausted when one cycle of operation of the nuclear reactor is completed.

The specification of U.S. Pat. Application Ser. No. 952,660 discloses the use of a fuel assembly containing a poison for obtaining a constant excess reactivity in accordance with an increase in the degree of fuel burn-up (exposure). This patent application shows that four fuel assemblies of different burning histories in combination constitute a unit, and of which one fuel assembly having the oldest burning history is replaced with a fuel assembly containing a poison each time one operation cycle of the nuclear reactor is completed. In U.S.P. Appln. Ser. No. 952,660, it is also disclosed to flatten the axial power distribution in the reactor core by providing a higher fuel enrichment in the upper part than in the lower part of the reactor core.

The above mentioned United States Patent Applications propose the use of fuel assemblies containing a burnable poison, in order to minimize the frequency of the mechanical control rod operation. Particularly, the specification of U.S. patent application Ser. No. 952,660 discloses an arrangement of combination of the fuel assemblies which is effective in maintaining a substantially constant excess reactivity over the whole period of the operation of the nuclear reactor.

These prior arts, however, are measures for the reactor core in the state of equilibrium or the equilibrium core, and are not for the initial core, i.e. the core immediately after the building of the nuclear reactor.

Of course, a nuclear reactor operation with minimized control rod operation is possible even with an initial core, if the initial core is arranged such that fuel assemblies of different burning histories are combined with a new poison-containing fuel assembly, as taught by U.S.P. Appln. Ser. No. 952,660. However, it is difficult and impractical to charge a newly built nuclear reactor with fuel assemblies that have been used in another reactor or reactors.

SUMMARY OF THE INVENTION

It is, therefore, an object of the invention to provide a reactor core arrangement which minimizes the frequency of the control rod operation even in the initial core.

It is another object of the invention to provide a method of economically using the fuel assemblies.

To these ends, according to the invention there is provided in the reactor core a fuel assembly arrangement having several fuel units placed in the central area of more than 50% of the whole area of the reactor core, each unit having four adjacent fuel assemblies surrounding a single control rod, wherein, in the case of an initial core state, one of the four fuel assemblies in each unit contains gadolinia while other three fuel assemblies do not contain gadolinia.

Further, a measure is provided for replacing one of the fuel assemblies containing no gadolinia with the same fuel assembly as the above-mentioned fuel assembly containing gadolinia, in each fuel replacement cycle.

These and other objects, as well as advantageous features of the invention will become more clear from the following description of the preferred embodiments taken in conjunction with the accompanying drawings.

BRIEF DESCRIPTION OF THE DRAWINGS

FIG. 6b is an illustration of the enrichment of the fuel rods constituting the fuel assembly shown in FIG. 6a.

FIG. 7 is an illustration of the characteristic of the fuel assembly as shown in FIG. 6a;

FIG. 8b is an illustration of the enrichments of fuel rods constituting the fuel assembly shown in FIG. 8a;

FIG. 9 is a chart showing the characteristic of the fuel assembly shown in FIG. 8a;

FIG. 10 is an illustration of a fuel replacement unit constituted by a combination of the fuel assemblies of the first embodiment;

FIGS. 11 and 12 are sectional views of the initial core arrangement of a boiling water reactor in accordance with the first embodiment of the invention in which FIG. 11 shows the right half section of a reactor core, while FIG. 12 shows a left half section of the reactor core;

FIG. 14a is an illustration of a low-enrichment fuel assembly containing no burnable poison constituting an initial core arranged in accordance with a second embodiment of the invention;

FIG. 14b is an illustration showing the enrichment of fuel rods constituting the fuel assembly shown in FIG. 14a;

FIG. 15a is an illustration of a medium-enrichment fuel assembly having no burnable poison, constituting an initial core arranged in accordance with the second embodiment of the invention;

FIG. 15b is an illustration showing the enrichments of the fuel rods constituting the fuel assembly as shown in FIG. 15a;

FIG. 16a is an illustration showing a high-enrichment fuel assembly containing a burnable poison, constituting an initial core arranged in accordance with the second embodiment of the invention;

FIG. 16b is an illustration showing the enrichments of the fuel assembly as shown in FIG. 16a;

FIG. 17 is a chart showing the characteristic of the fuel assembly shown in FIG. 14a;

FIG. 18 is a chart showing the characteristic of the fuel assembly shown in FIG. 15a;

FIG. 19 is a chart showing the characteristic of the fuel assembly as shown in FIG. 16a;

FIG. 23 is an illustration of the control rod operation plan in accordance with the second embodiment of the invention.

DESCRIPTION OF THE PREFERRED EMBODIMENTS

Before turning to the description of each preferred embodiment, a general description will be made as to the principle of the invention, with reference to FIGS. 1 to 5.

A conventional boiling water reactor is so designed that the excessive reactivity in the reactor core is maintained at a specified level over a predetermined period after the loading of the core with the fuel, by the suitable use of fuel assemblies containing gadolinia as a burnable poison.

Figure 1:
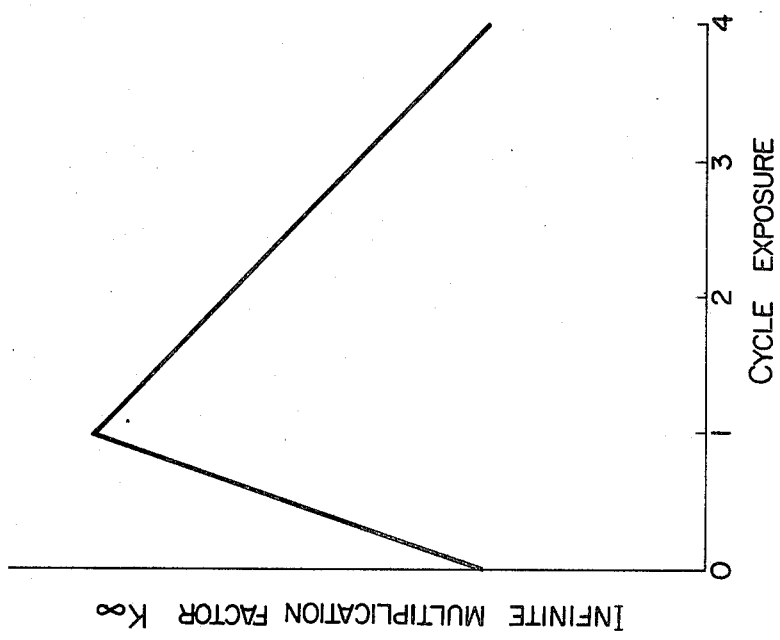
FIG. 1 is a chart showing the characteristic of a fuel assembly containing a burnable poison.

FIG. 1 shows an infinite neutron multiplication factor $K\infty$ of a fuel containing gadolinia. More specifically, the axis of abscissa represents the number of cycles of the reactor core, the number being in proportion to the mean degree of burn-up of the fuel in the reactor core, while the axis of ordinate represents the infinite neutron multiplication factor $K\infty$ which is a parameter of the reactivity in the reactor core. A large number of fuel assemblies remain over four cycles in the reactor core and are then replaced.

In the first cycle after the loading of the reactor core with the fuel, the increase of reactivity in the gadolinia containing fuel is remarkable due to the burning of the gadolinia. In fact, the infinite neutron multiplication factor $K\infty$ is increased at a rate of 3% per degree of fuel burn-up of 1 GWd/st. Also, since the gadolinia containing fuel is so determined that the gadolinia is completely burnt in the first cycle, the reactivity of the fuel is decreased steadily due to the burning up of the fissionable material, in and after the second cycle. The rate of reduction in the infinite neutron multiplication factor $K\infty$ is not so much affected by the enrichment of the fuel, and is decreased gradually at a rate of 1% per 1 GWd/st.

Figure 2:
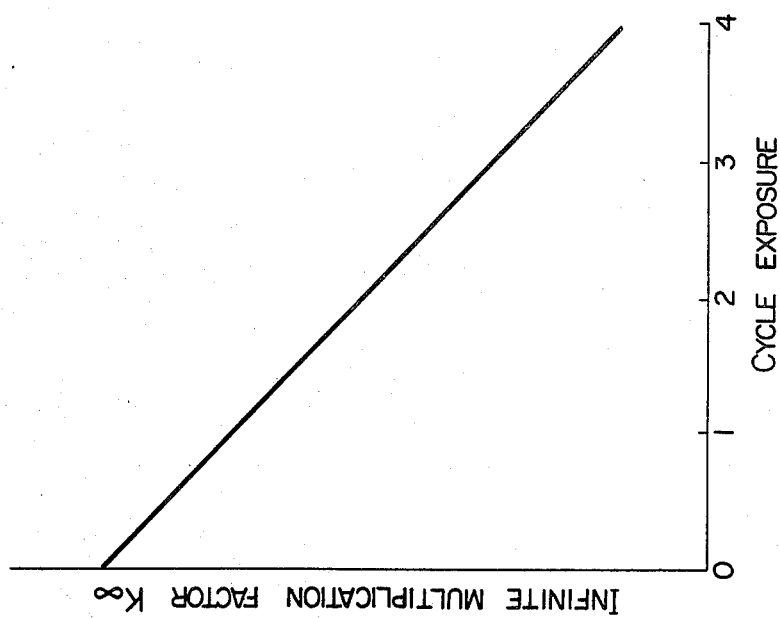
FIG. 2 is a chart showing the characteristic of a fuel assembly containing no burnable poison.

FIG. 2 shows the infinite neutron multiplication factor $K\infty$ of the fuel containing no gadolinea. In this case, the infinite neutron multiplication factor $K\infty$ is steadily decreased throughout the four cycle of stay of the fuel in the reactor core. The rate of reduction of the factor $K\infty$ does not so much depend on the enrichment of the fuel and is about 1% per degree of burn-up of 1 GWd/st. This rate of reduction of the infinite neutron multiplication factor is equal to the rate of reduction of the factor $K\infty$ in the gadolinia containing fuel after the completion of burning of the gadolinia.

Figure 3:
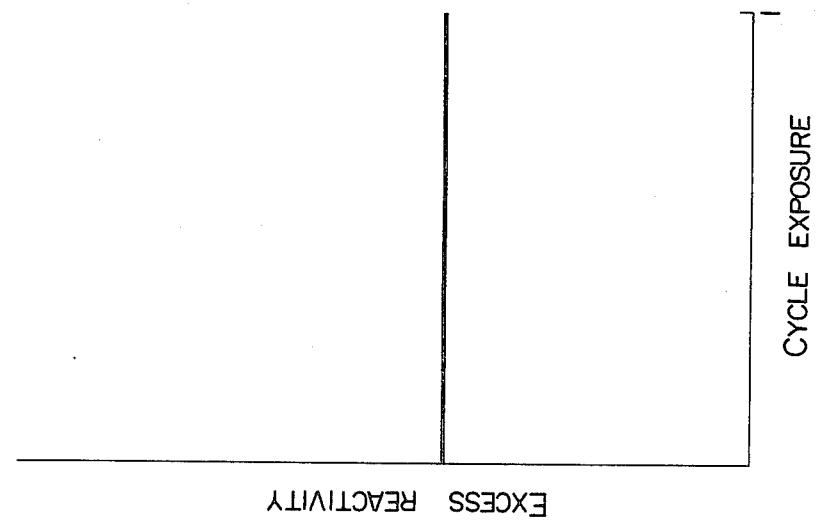
FIG. 3 is a chart showing a characteristic which is obtained by a combination of the characteristics as shown in FIGS. 1 and 2.

Assuming here that a fuel unit is constituted by four fuel assemblies surrounding single control rod, one of these four fuel assemblies containing gadolinia while the remaining three fuel assemblies containing no gadolinia, the infinite neutron multiplication factor $K\infty$ in the fuel unit as a whole does not substantially change with the degree of burn-up, because the fuel assembly containing gadolinia exhibits 3% increase in the factor $K\infty$ per degree of fuel burn-up of 1 GWd/st, while other three fuel assemblies containing no gadolinia exhibit in each about 1% decrease in the factor $K\infty$ per degree of burn-up of 1 GWd/st. Therefore, a substantailly constant excess reactivity per each fuel unit is maintained throughout the first cycle as shown in FIG. 3.

According to the invention, therefore, the fuel assemblies placed in the central area of the reactor core occupying more than 50% of the total area of the reactor core are grouped into a plurality of fuel units each of which having four fuel assemblies surrounding a single control rod. One of the four fuel assemblies in each unit is renewed at each fuel replacement cycle. The initial core is so arranged that, in each of the fuel units, one of the four fuel assemblies contains gadolinia while other three fuel assemblies do not contain the gadolinia. At each fuel replacement cycle, one of the fuel assemblies containing no gadolinia is replaced with a fuel assembly which is the same as the fuel assembly containing gadolinia placed in the initial core. Thus, according to the invention, all of the four fuel assemblies in each fuel unit will have been replaced with the new fuel assemblies, after 3 (three) fuel replacement cycles have elapsed.

In contrast to the above, in the conventional arrangement of an initial core, all of the four fuel assemblies consisting the fuel unit have enrichment and gadolinia content different from the above-mentioned fuel assembly containing gadolinia according to this embodiment. In this case, therefore, four fuel replacement cycles are required until all of the four fuel assemblies in the fuel unit have been replaced with the new fuel assembly containing gadolinia. If fuel assembly containing gadolinia which is denoted hereinafter as gadolinia-containing fuel assembly according to this embodiment is installed in the initial core, it is possible to smoothly shift the reactor operation from the first to the next fuel replacement cycles. In addition, the reactor core characteristic in the first cycle resembles that of the subsequent cycles. Namely, the excess reactivity in the first cycle is stabilized and, in even the subsequent cycles the new fuel assembly positioned in each fuel unit provides the increase in the factor $K_\infty$ which negates the decrease in $K_\infty$ of the other three fuel assemblies so as to diminish the change of the excess reactivity. Further, fuel assemblies of low enrichment can be used as the fuel assemblies containing no gadolinia in the initial core, because it is not necessary for the reactivities of these fuel assemblies to be forcedly suppressed by the gadolinia.

This situation will be described in more detail hereinafter.

Figure 4:
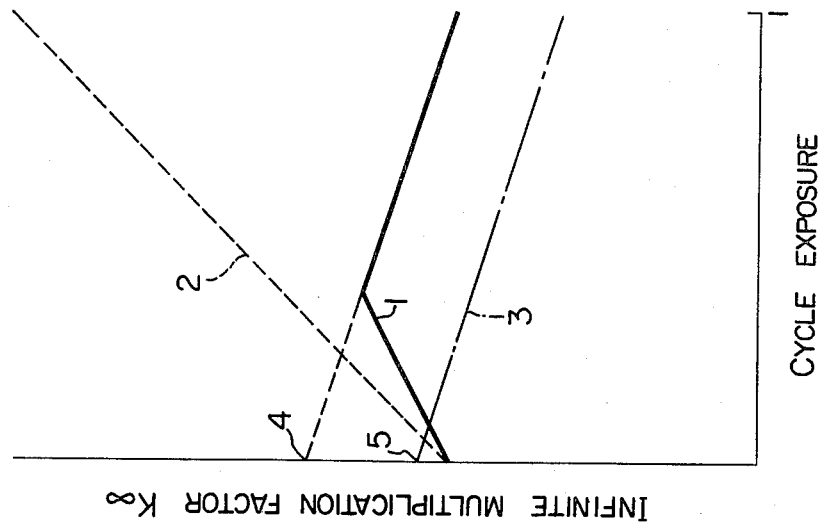
FIG. 4 is a chart showing the characteristics of different fuel assemblies in the second operation cycle of a nuclear reactor.

FIG. 4 shows the change of the infinite multiplication factor $K_\infty$ in the first cycle. As will be seen from the curve designated at reference numeral 1, the fuel assembly for conventional initial core arrangement exhibits an infinite neutron multiplication factor $K_\infty$ which varies with the degree of fuel burn-up such that a peak value is observed at an intermediate point in the first cycle. Curves designated at reference numerals 2 and 3 denote, respectively, the gadolinia-containing fuel assembly and fuel assembly containing no gadolinia which in combination constitute the initial core arranged in accordance with the present invention. According to the invention, one of the four fuel assemblies of each fuel unit is a gadolinia-containing fuel assembly which exhibits the characteristic as shown by curve 2, while the remainder are fuel assemblies which exhibit the characteristic shown by curve 3 in FIG. 4.

Figure 5:
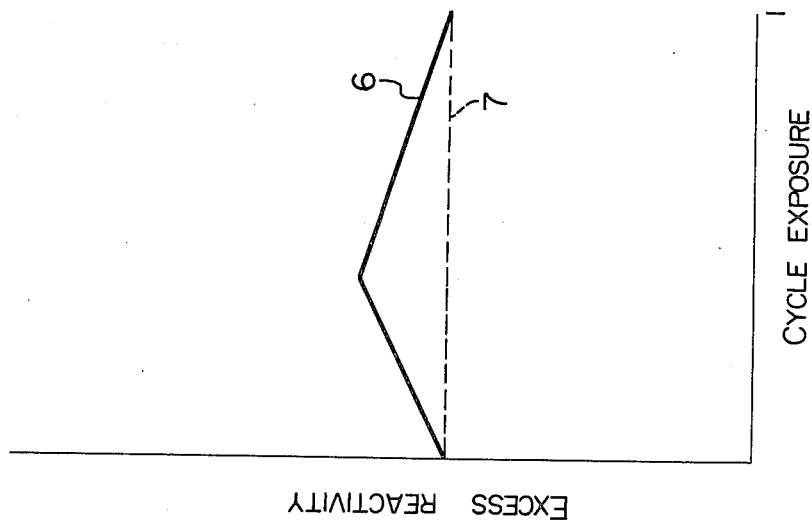
FIG. 5 is a chart showing the characteristic of a reactor core arranged in accordance with the invention, in comparison with that of a reactor core of a conventional arrangement.

If the central region of the reactor core occupying more than 50% of the reactor core is constituted solely by the gadolinia-containing fuel assemblies which exhibit the conventional characteristic as shown by the curve 1, the reactor core shows a change of excess reactivity as shown by curve 6 in FIG. 5. Namely, the excess reactivity is once increased to take a maximum or peak value at a point intermediate of one cycle and then decreased. In the conventional reactor, this change of excess reactivity had to be compensated for by the mechanical control rod operation.

In contrast to the above, according to the invention, the central region of the reactor core occupying more than 50% of the total area of the reactor core is constituted by a plurality of units each having one gadolinia-containing fuel assembly exhibiting the characteristic as shown by curve 2 and three fuel assemblies containing no gadolinia which show the characteristic as shown by curve 3 in FIG. 4. Consequently, the excess reactivity remains substantially constant throughout the cycle, as shown by curve 7 in FIG. 5. This in turn eliminates the frequent control rod operation for maintaining constant excess reactivity to provides an improved rate of operation of the nuclear reactor.

The minimum level of the excess reactivity to be maintained is beforehand determined by various restrictions and requirements concerning the operation of the nuclear reactor. Conventionally, the enrichment of the fuel assemblies is determined to ensure an excess reactivity of a level higher than that of the minimum level throughout the burning period, and the amount of insertion of the control rods is selected to negate the surplus excess reactivity. Thus, conventionally, the fuel assemblies are required to have a high mean enrichment corresponding to the value of the infinite multiplication factor $K_\infty$ as shown by point 4 in FIG. 4.

However, according to the invention, the initial core is constituted by two types of fuel assemblies: the gadolinia-containing fuel assemblies having a characteristic as shown by curve 2 and the fuel assemblies containing no gadolinia showing a characteristic as shown by the curve 3 in their number in FIG. 4 which are combined at a ratio of 1:3. Therefore, in order to maintain the excess reactivity in the reactor core, the fuel assemblies having no gadolinia are required to have a comparatively low mean enrichment corresponding to the value of the infinite neutron multiplication factor $K_\infty$ shown in FIG. 4 by point 5. This in turn provides an improved fuel economy, because, in general, the fuel assemblies of lower enrichment can be produced at a lower cost.

The reason why the fuel unit is constituted by four fuel assemblies is that, in the central region of the core in which the power level is high, it is preferred that all of the fuel assemblies are replaced in four cycles, each cycle being 1 year, from the view point of degree of fuel burn-up. Also, the reason why the adjacent four fuel assemblies constitute one fuel unit for fuel replacement is that, by so doing, it is possible to maintain the symmetry and homogeniety of the reactor core. Further, the reason why the region in which the fuel units each consisting of four fuel assemblies are arranged, is limited to be the central region of the core occupying more than 50% of the total area of the core, is for the following reasons: Firstly, the described advantage cannot be fully enjoyed if the ratio of the area of the designated region to the total area of the reactor core is small. Secondly, since the power is comparatively low at the peripheral portion of the reactor core, the fuel assemblies can remain over 5 or more cycles in the peripheral portion, so that it is not necessary to adopt the concept of fuel units consisting of four fuel assemblies in the peripheral portion.

Hereinafter, a first embodiment of the invention will be described in detail with specific reference to FIGS. 6a to 13.

It is assumed here that the boiling water reactor to which the present invention is applied has a rated electric output of 1100 $MW^e$ and that the reactor core is constituted by 764 fuel assemblies each of which includes 62 fuel rods and 2 (two) water rods of 146 inches high.

Figure 6A:
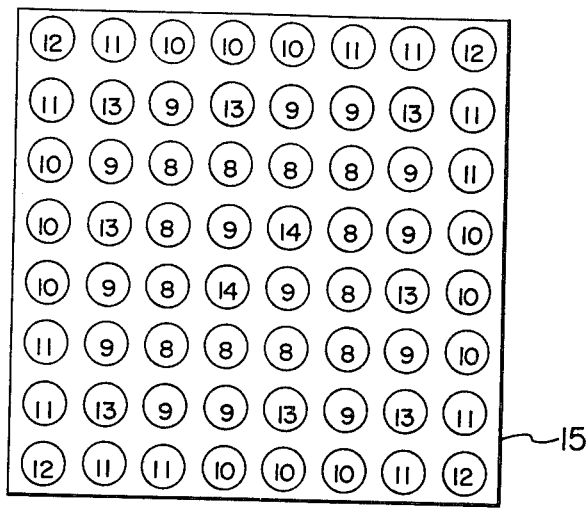
FIG. 6a is an illustration of a fuel assembly containing a burnable poison, constructed in accordance with a first embodiment of the invention.
Figure 6B:
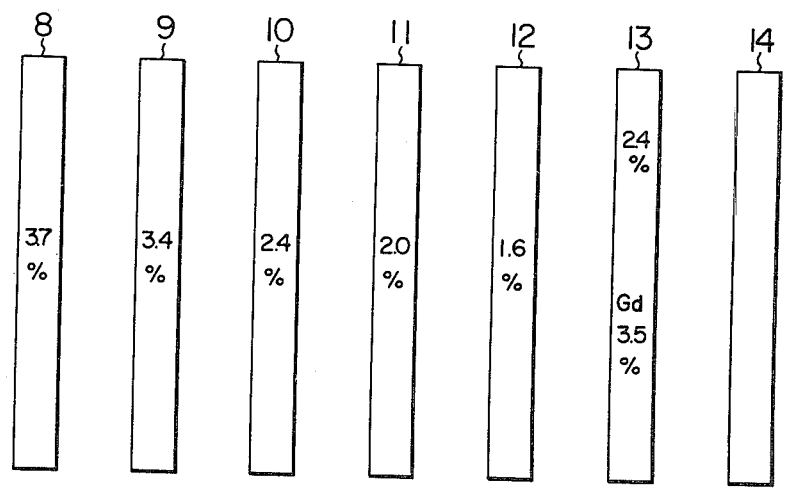

FIGS. 6a and 6b in combination show an example of the gadolinia-containing fuel assembly for replacement. The gadolinia-containing fuel assemblies for the initial core has the same construction as the replacement fuel assembly as shown in FIGS. 6a and 6b. FIG. 6a shows the cross-section of the fuel assembly, while FIG. 6b shows respective fuel rods and water rods. Reference numerals 8 to 12 denote fuel rods having enrichments of 3.7%, 3.4%, 2.4%, 2.0% and 1.6%, respectively. Fuel rods having an enrichment of 2.4% and gadolinia concentration of 3.5% are designated at reference numerals 13. Finally, the reference numeral 14 denotes the water rods. The fuel assembly as a whole has a mean fuel enrichment of 2.77% and is accomodated in a channel box 15.

Figure 7:
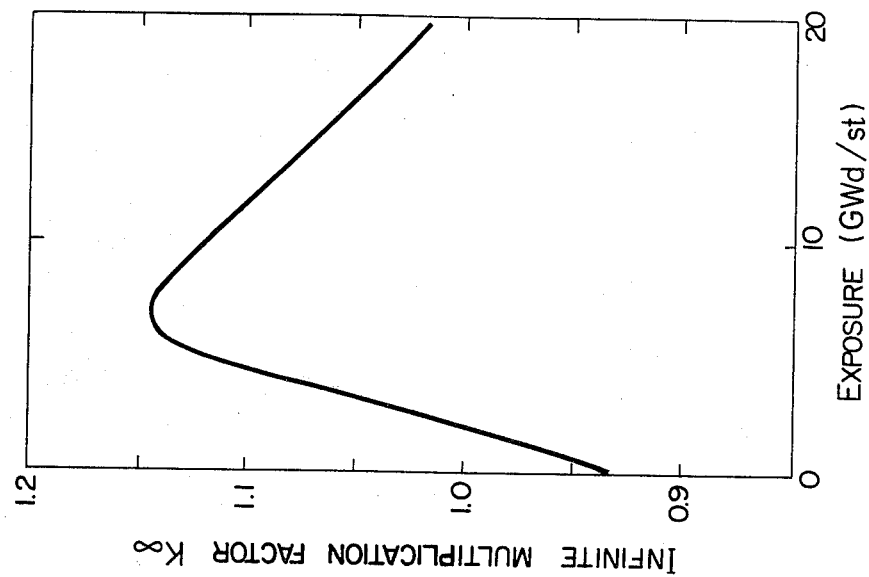

FIG. 7 is a chart showing the relationship between the degree of burn-up and the infinite neutron multiplication factor $K_\infty$ as observed in the fuel assembly for replacement. This relationship is obtained by a calculation made on an assumption that the void fraction is 40%. As will be understood from this Figure, the infinite neutron multiplication factor $K_\infty$ increases steadily in the beginning period of the burning, because the gadolinia is reduced as the burning proceeds. The rate of increase of the factor $K_\infty$, however, is gradually decreased as the degree of burn-up reaches 6 GWd/st and, when the degree of burn-up exceeds 8 GWd/st, the factor $K_\infty$ begins to decrease. The rate of increase of the factor $K_\infty$ is about 3.5% per 1 GWd/st, while the rate of decrease of the factor $K_\infty$ is about 1.1% per 1 GWd/st. In this embodiment, one cycle shown in FIG. 1 corresponds to the degree of fuel burn-up of about 6.2 GWd/st.

Figure 8A:
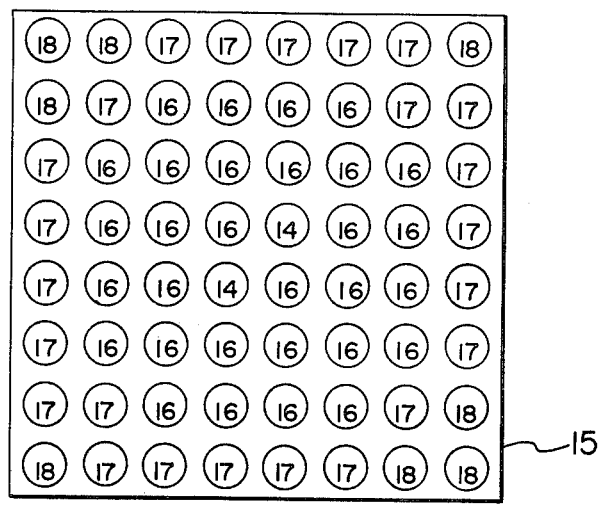
FIG. 8a is an illustration of a fuel assembly containing no burnable poison, constructed in accordance with the first embodiment of the invention.
Figure 8B:
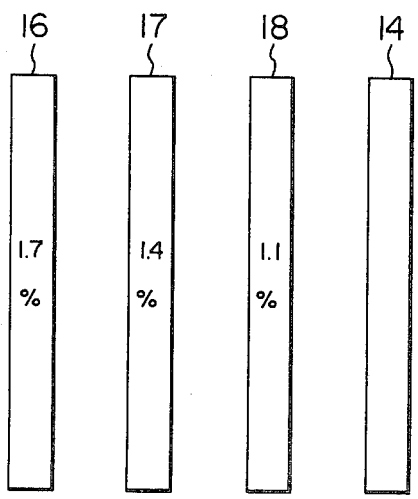

FIGS. 8a and 8b show an example of the fuel assembly containing no gadolinia which is used also as the constituent of the initial core in accordance with the invention. More specifically, FIG. 8a shows the cross-section of the reactor core, while FIG. 8b shows fuel rods and water rods constituting the fuel assembly. Reference numerals 16 to 18 denote the fuel rods having enrichments of 1.7%, 1.4% and 1.1%, respectively, while a reference numeral 14 denotes a water rod. The fuel assembly as a whole has a mean enrichment of 1.51%, and is accommodated by a channel box 15.

Figure 9:
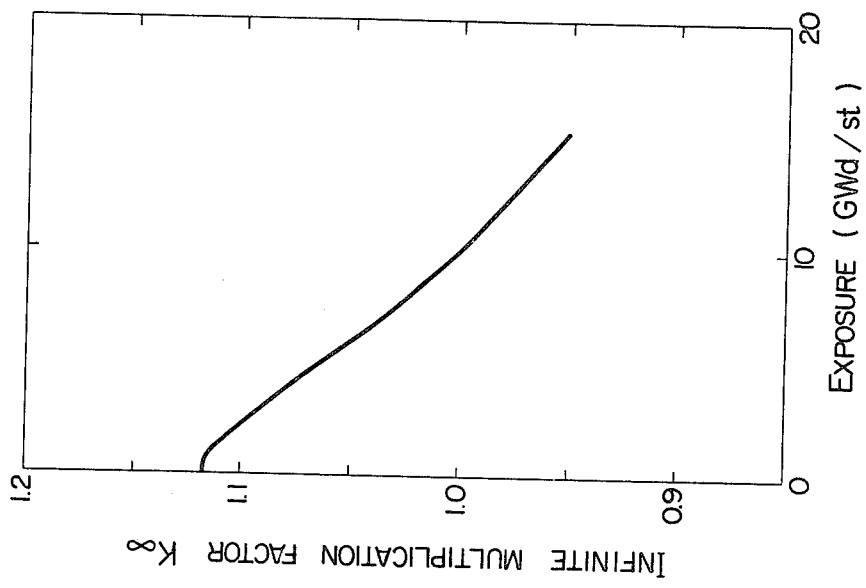

FIG. 9 shows the relationship between the degree of fuel burn-up and the infinite nuetron multiplication factor $K_\infty$ as observed in the fuel assembly as shown in FIG. 8a. The factor $K_\infty$ steadily decreases as the degree of fuel burn-up increases, because this fuel assembly does not contain the gadolinia. The rate of decrease of the factor $K_\infty$ is about 1.1% per 1 GWd/st.

FIG. 10 shows the construction of an example of the fuel unit consisting of four adjacent fuel assemblies in the initial core arranged in accordance with the invention. In this Figure, reference numerals 21 to 23 denote the fuel assemblies containing no gadolinia as shown in FIG. 8a, while a reference numeral 24 denotes the gadolinia-containing fuel assembly which is same as that for the replacement as shown in FIG. 6a. At the beginning of the second cycle, the fuel assembly 21 is replaced with the fuel assembly for replacement shown in FIG. 6a. Similarly, the fuel assemblies 22 and 23 are replaced with the fuel assemblies for the replacement, at the beginning of the third and the fourth cycles, respectively. Therefore, in the fourth cycle, all of the fuel assemblies constituting the unit have been replaced with the assemblies for replacement.

The replacement of the fuel assemblies in the mentioned order can be achieved in a conventional method. The description of the fuel replacing method therefore, is omitted.

Figure 11:
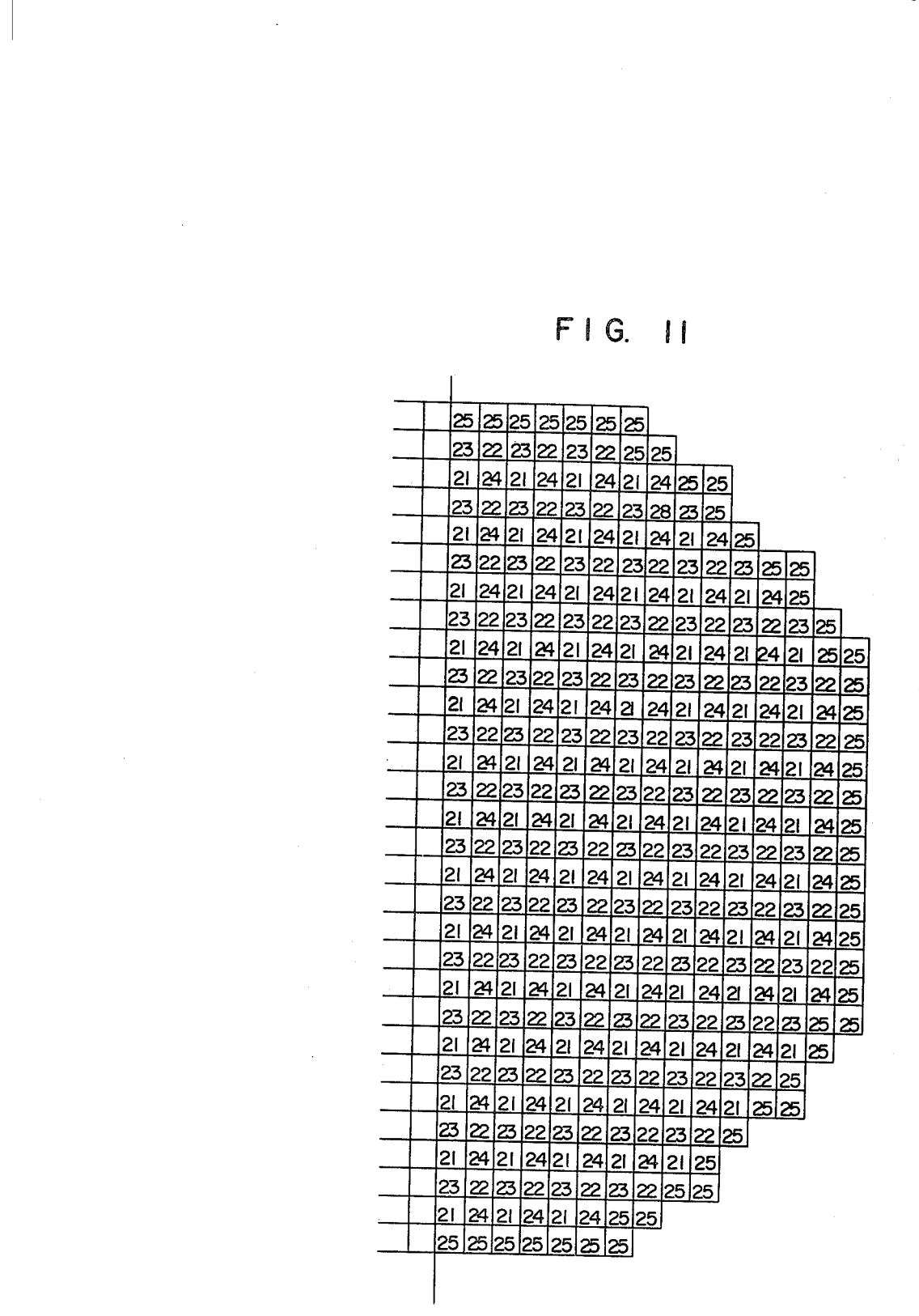
Figure 12:
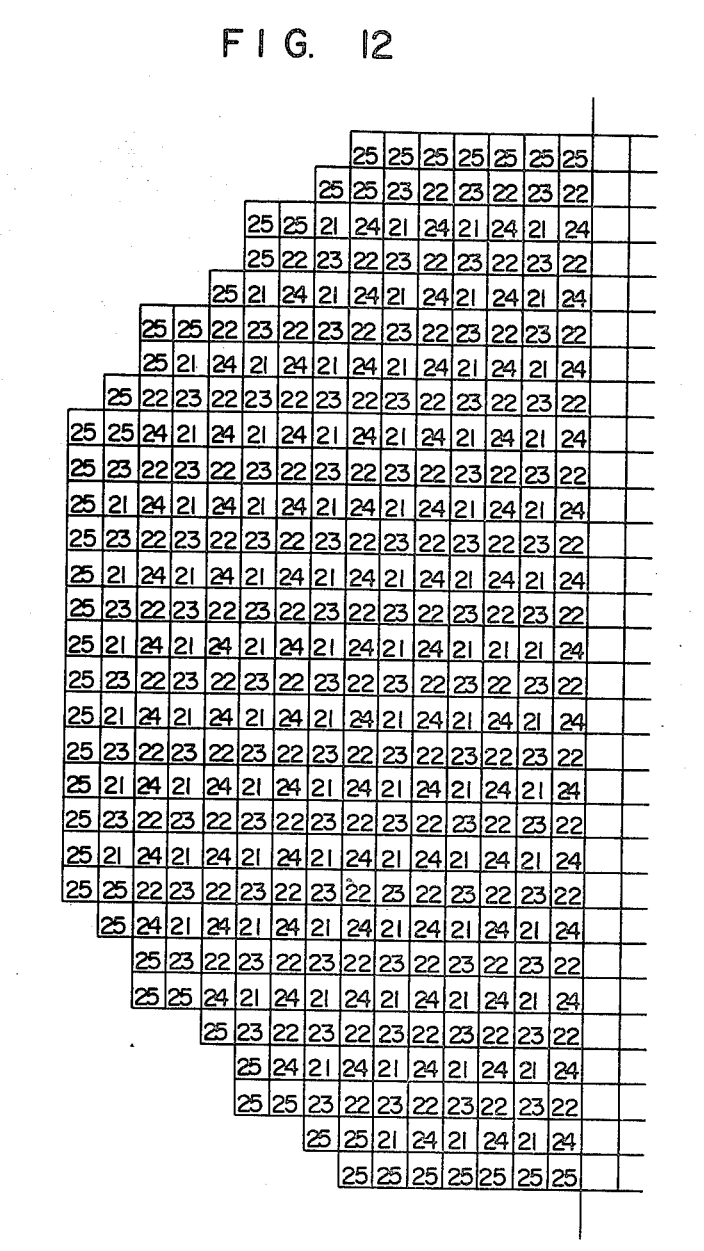

FIGS. 11 and 12 in combination show an example of the initial core of a boiling water reactor, arranged in accordance with the present invention. More specifically, FIGS. 11 and 12 show the right and left half sections of the reactor core. In these Figures, reference numerals 21 to 23 denote the fuel assemblies same as that shown in FIG. 10, while a reference numeral 24 denote fuel assemblies for replacement. Further, a reference numeral 25 denotes fuel assemblies which are placed in the peripheral portion of the reactor core and allowed to stay in the reactor core over 5 or more cycles. The fuel units each having the fuel assemblies 21 to 24 are placed in the region other than the peripheral portion of the reactor core. Preferably, these units are placed in the central region of the reactor core occupying more than 50% of the area of the reactor core.

Figure 13:
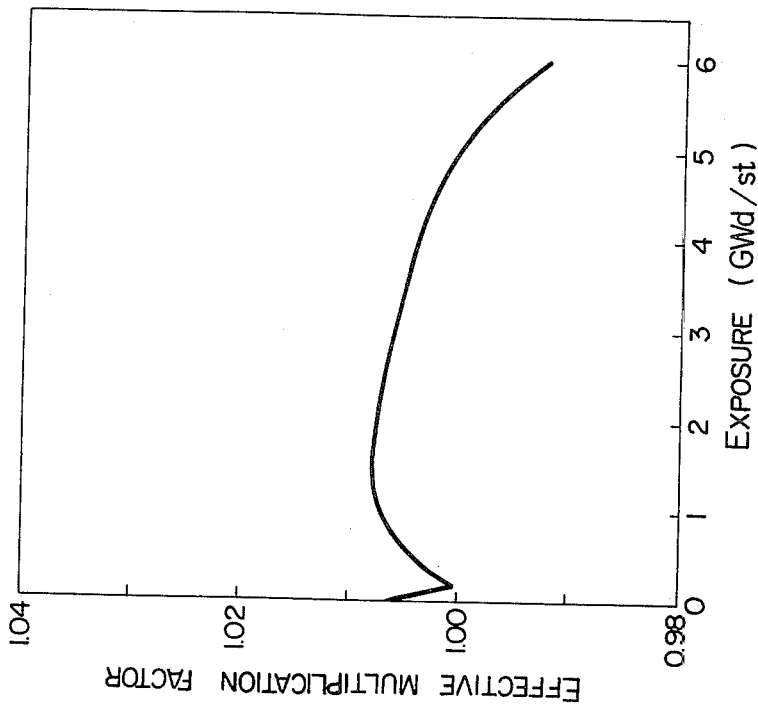
FIG. 13 is a chart showing the relationship between the degree of burn-up (exposure) and the effective neutron multiplication factor as observed in the first cycle of operation of an initial core arrangement of the first embodiment.

FIG. 13 shows the relationship between the effective neutron multiplication factor Keff and the degree of fuel burn-up as observed when the initial core is arranged in the manner shown in FIGS. 11 and 12. This relationship is determined by a calculation made on an assumption that the burning is effected with a predetermined number of control rods inserted in the reactor core, in order to evaluate the degree of change of the excess reactivity. It will be seen that the fluctuation of the factor Keff is maintained within a region of ±0.8% throughout the first cycle. This tells that the change of the excess reactivity with the fuel burn-up is small and the excess reactivity is stabilized in the initial core, thanks to the fuel assembly arrangement of the invention. As has been described, in the first embodiment of the invention, the central region of initial core is constituted by a plurality of fuel units each of which has one gadolinia-containing fuel assembly same as that for the replacement and three fuel assemblies containing no gadolinia. Therefore, during the first cycle the change of the excess reactivity in relation to the fuel burn-up is small so that the mechanical control rod operation for maintaining substantially constant excess reactivity is eliminated to ensure a high plant capacity factor of the reactor core. Similarly, a stable nuclear reactor operation is obtained also in the second, third and fourth cycles because the three fuel assemblies are each replaced one after the other at each cycle with a fuel assembly for replacement which is same as that of the gadolinia containing fuel assembly of the initial core. Further, according to the invention, it is possible to improve the fuel economy, because the mean enrichment of the fuel assemblies containing no gadolinia in the initial core required for maintaining the predetermined excess reactivity is made smaller than the mean enrichment of the gadolinia-containing fuel assembly.

Hereinafter, a second embodiment of the invention will be described with reference to FIGS. 14a thru 23.

Figures 14A, 14B, 15A, 15B, 16A, 16B:
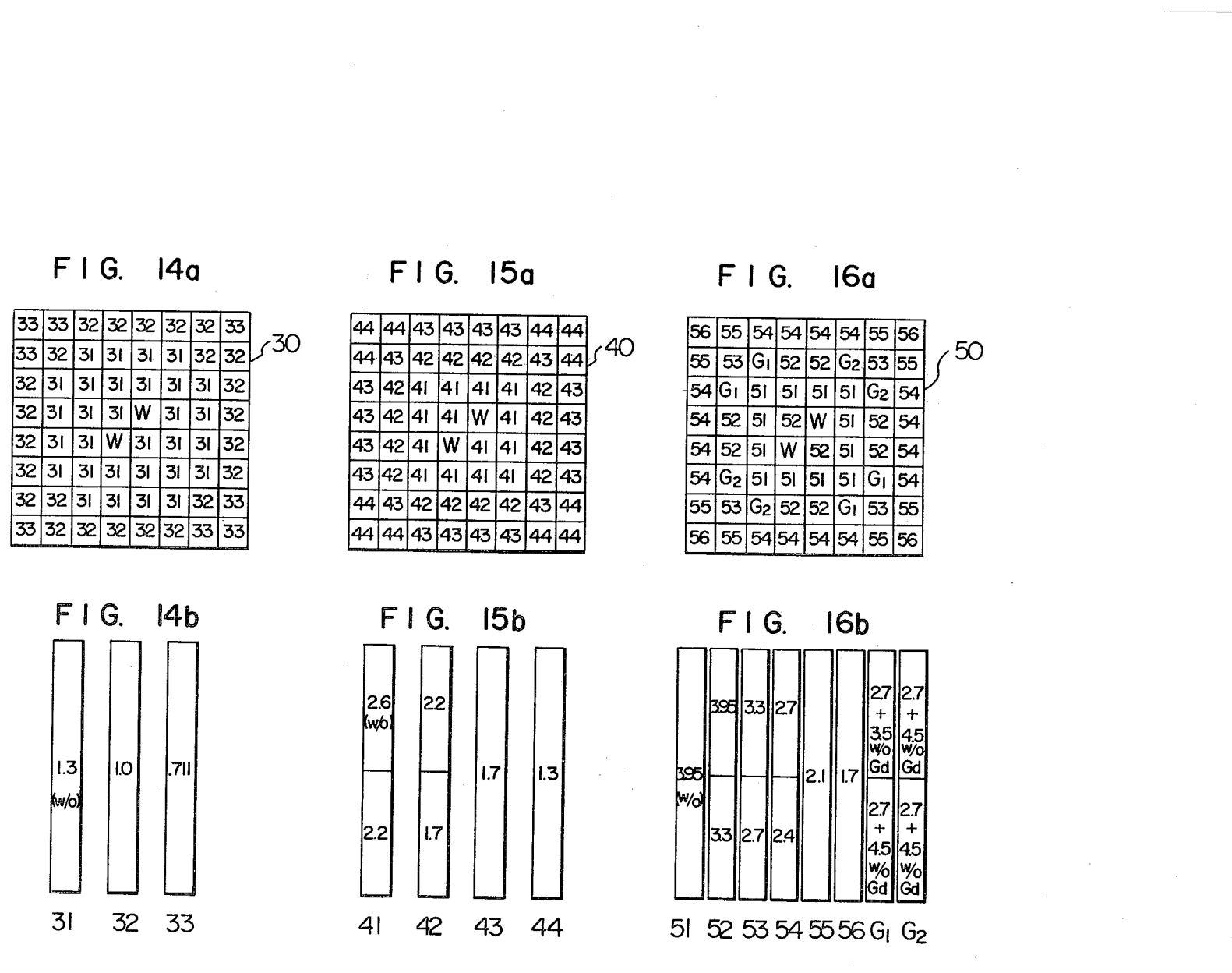
Figure 17:
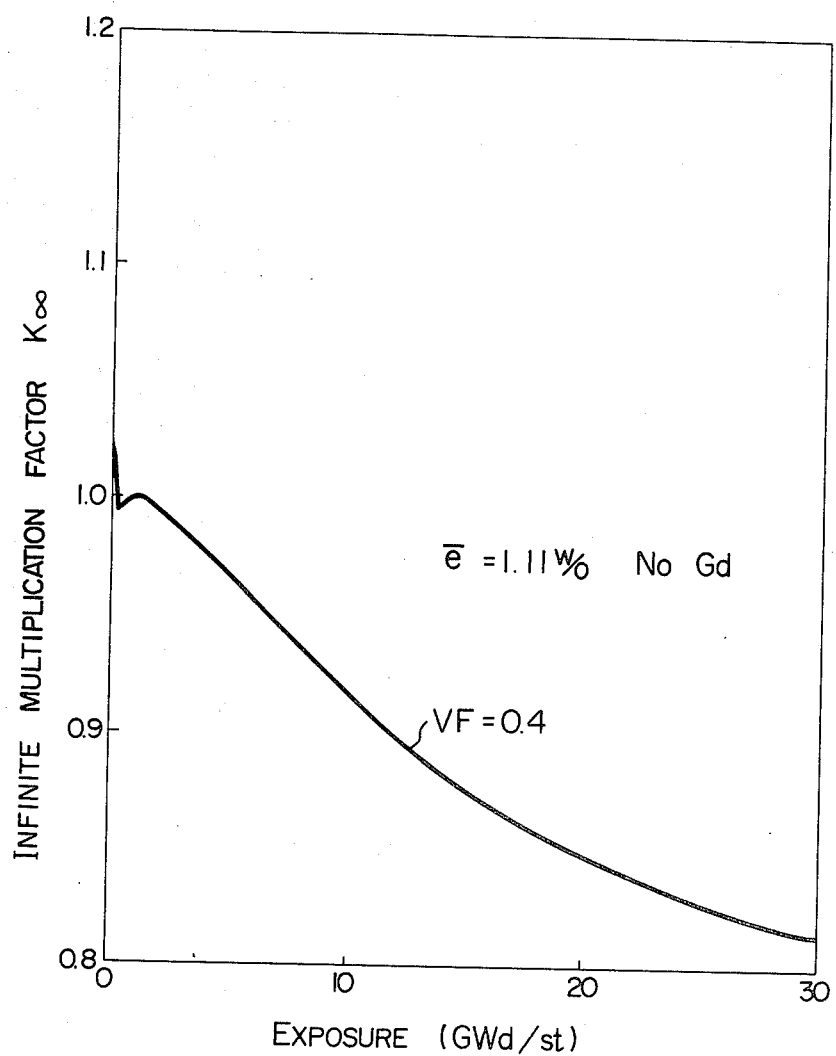

FIG. 14a shows a low enrichment fuel assembly 30 containing no gadolinia for the initial core arranged in accordance with the second embodiment of the invention. FIG. 14b shows the enrichments of fuel rods 31, 32, 33 constituting the low enrichment fuel assembly shown in FIG. 14a. A symbol W in FIG. 14a represents the water rod. The low enrichment fuel assembly 30 containing no gadolinia exhibits an infinite neutron multiplication factor $K_\infty$ which varies in relation to the degree of fuel burn-up in a manner as shown in FIG. 17.

Figure 18:
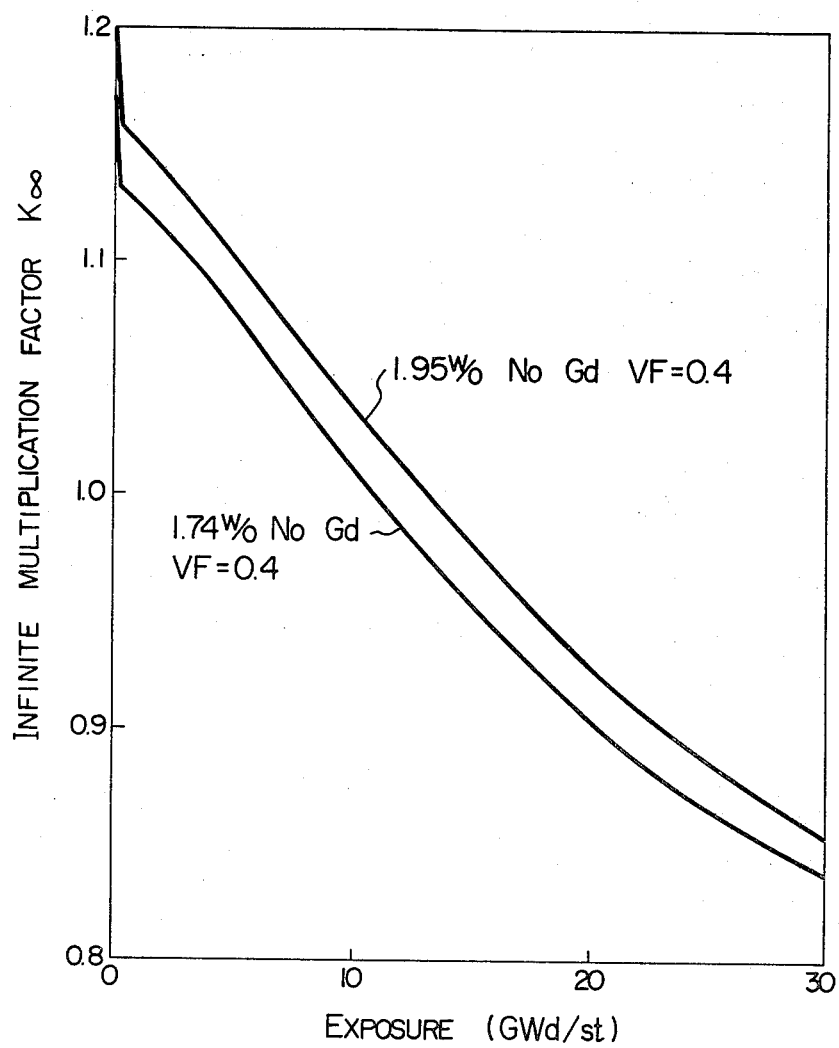

FIG. 15a shows a medium enrichment fuel assembly 40 containing no gadolinia for the initial core arranged in accordance with the second embodiment of the invention, while FIG. 15b shows the enrichments of the fuel rods 41, 42, 43, 44 constituting the medium enrichment fuel assembly 40 as shown in FIG. 15a. Among these fuel rods, each of the fuel rods 41, 42 has an enrichment which is higher in the upper portion than in the lower portion thereof, so that the medium enrichment fuel assembly allows the reactor core to have a flattened power distribution in the axial direction of the reactor core. The medium enrichment fuel assembly 40 exhibits a $K_\infty$ characteristic as shown in FIG. 18. More specifically, since this fuel assembly includes fuel rods having different enrichments in their upper and lower portions, the fuel assembly 40 exhibits different $K_\infty$ characteristics in its upper and lower portions, as denoted by 1.95 w/o NoGd and 1.74 w/oNoGd, respectively.

FIG. 16a shows a high enrichment gadolinia containing fuel assembly 50, while FIG. 16b shows the enrichments of the fuel rods 51, 52, 53, 54, 55, 56, G1 and G2 constituting the gadolinia-containing high enrichment fuel assembly 50. Symbols G1 and G2 represent the gadolinia-containing fuel rods. The gadolinia containing fuel rod G1 has different gadolinia contents in its upper and lower portions. More specifically, the gadolinia content is lower in the upper portion of the fuel rod G1 than at the lower portion of the same. Each of the fuel rods 52, 53, 54 has higher enrichment in its upper portion than in its lower portion.

Figure 19:
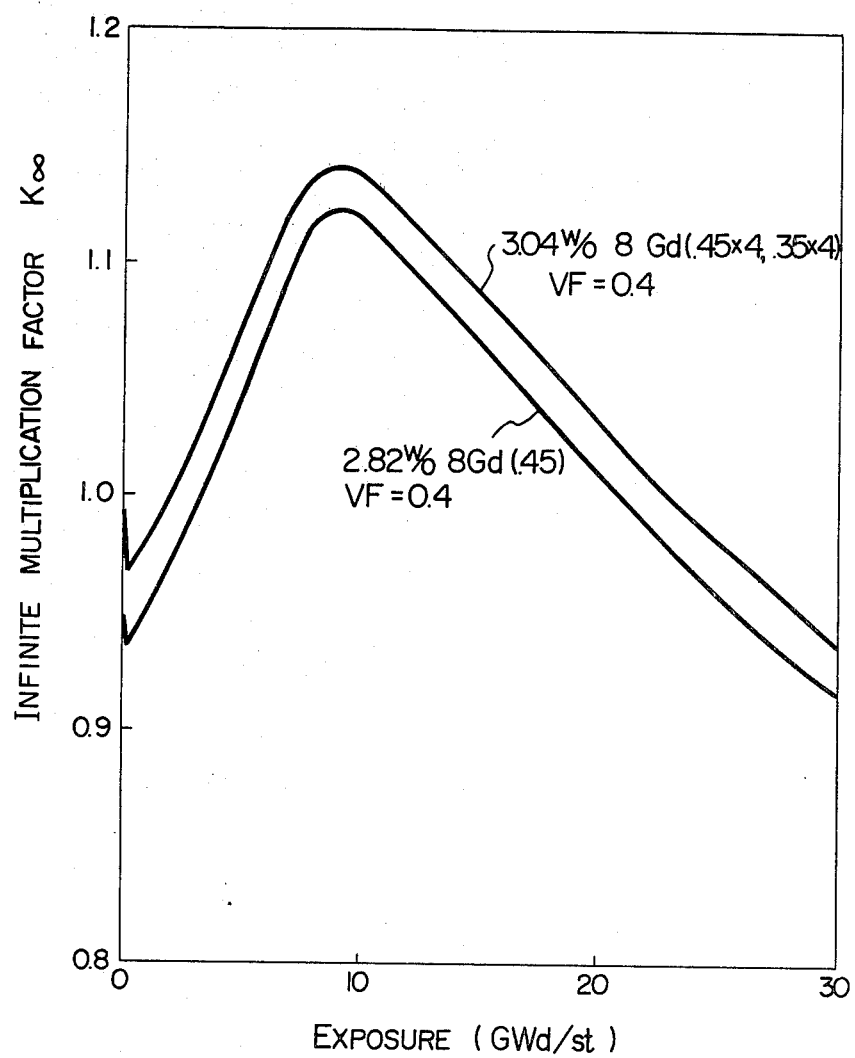

This gadolinia-containing high enrichment fuel assembly 50 as a whole exhibits a $K_\infty$ characteristic as shown in FIG. 19 by curve 3.04 w/oGd and a $K_\infty$ characteristic as shown by curve 2.82 w/oGd are observed in the upper and lower portions of the fuel assembly 50, respectively.

Figure 20:
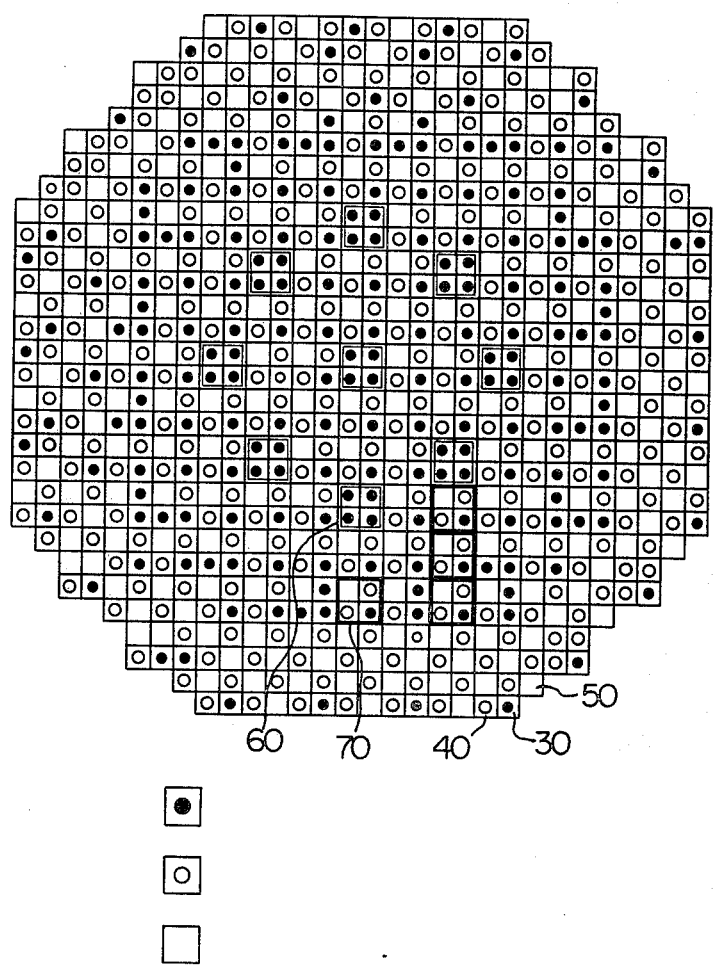
FIG. 20 is a sectional view of an initial reactor core arranged in accordance with the second embodiment of the invention.

FIG. 20 shows the initial core constituted by the low enrichment fuel assemblies 30, medium enrichment fuel assemblies 40 and the gadolinia-containing high enrichment fuel assemblies 50. A fuel unit constituted by four fuel assemblies is exemplarily designated at a reference numeral 70. Most of the fuel units have two medium enrichment fuel assemblies 40 disposed on a diagonal line, one gadolinia-containing high enrichment fuel assembly 50 and one low enrichment fuel assembly 30 which are arranged in symmetry with respect to the diagonal line.

Four low enrichment fuel assemblies 60 within a double-line square 60 constitute a control cell. The control rods are inserted only to the control cells 60 and are operated mechanically as required during the operation of the nuclear reactor.

As in the case of the first embodiment, the fuel replacement plan is such that one of the fuel assemblies of each fuel unit 70 is replaced with the a replacement fuel assembly upon completion of each cycle. More specifically, after the completion of the first cycle, the low enrichment fuel assembly 30 is replaced with a gadolinia-containing high enrichment fuel assembly 50. Similarly, when the second cycle is completed, one of the medium enrichment fuel assembly 40 is replaced with a gadolinia-containing high enrichment fuel assembly 50, while the other medium enrichment fuel assembly 40 is replaced with a gadolinea-containing high enrichment fuel assembly 50 upon completion of the third cycle. In each of the subsequent cycles, an inert assembly with the oldest burn-up history is renewed in each of the fuel unit 70. The low enrichment fuel assemblies 30 in the control cell 60 are replaced one by one with new low enrichment fuel assembly 30 upon completion of each cycle.

Figure 21:
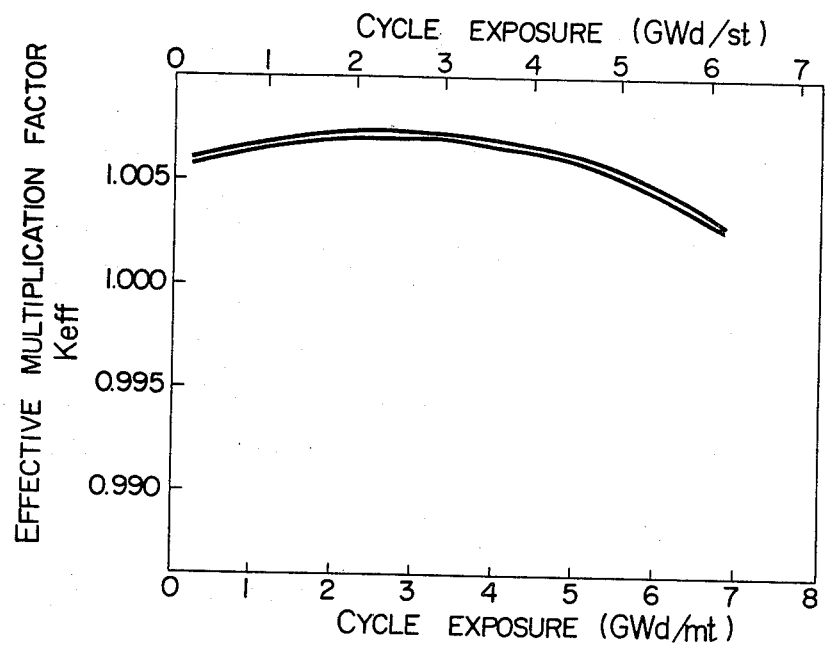
FIG. 21 is a chart showing the relationship between an degree of burn-up (exposure) in the initial core and the effective neutron multiplication factor as observed in the second embodiment of the invention.

FIG. 21 shows how the effective neutron multiplication factor Keff is changed with the degree of fuel burn-up throughout the first cycle in the initial core arranged in accordance with the second embodiment. In this second embodiment two different kinds of fuel assemblies containing no gadolinia are used: one is the low enrichment fuel assembly 30 while the other is the medium enrichment fuel assembly 40. The initial core arrangement of the second embodiment, therefore, is complicated as compared with that of the first embodiment. However, since the change of the effective neutron multiplication factor Keff in relation to the degree of burn-up is comparatively flat, the control of the initial core is considerably facilitated.

Figure 22:
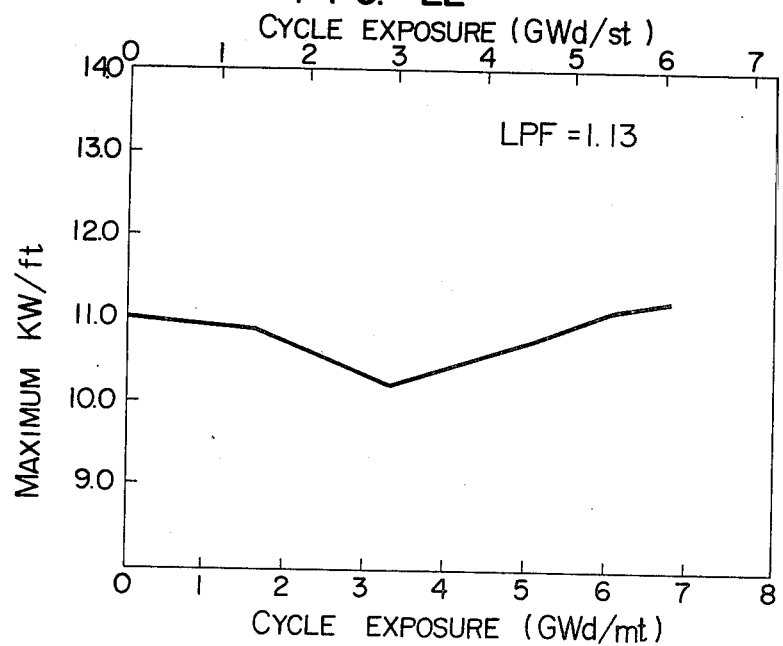
FIG. 22 is a chart showing the thermal characteristic of the second embodiment of the invention.

FIG. 22 shows how the maximum linear output density is changed in relation to the degree of fuel burn-up, for a better understanding of the thermal characteristic of the reactor core. It will be seen that a sufficient thermal margin is obtained also in the reactor core having small change of excess reactivity as in the second embodiment.

FIG. 23 illustrates the control rod operation plan in the first cycle for the reactor core arranged in accordance with the second embodiment of the invention. The numerals shown around the center of the core represent the number of notches of the control rods inserted into the control cells. The number of control rods is 9 which is smaller than that of the conventional reactor core, therefor an easier mechanical control of the control rods can be realized.

In the second embodiments, two kinds of fuel assemblies containing no gadolinia, i.e. the low enrichment fuel assemblies 30 and the medium enrichment fuel assemblies 40 are used. Since these fuel assemblies contain no gadolinia, they can have a considerably lowered enrichments. It is recalled that, in the conventional reactor core, all of the four fuel assemblies constituting one fuel unit are the gadolinia-containing high enrichment fuel assemblies. In the described embodiment of the invention, however, the number of the gadolinia-containing high enrichment fuel assemblies is reduced to about ¼, so that the initial core is obtainable at a reduced cost.

Further, since a comparatively flat Keff characteristic is maintained throughout the first cycle of the initial core, the frequency of control rod operation is further decreased to improve the plant capacity factor of the nuclear reactor.

Although the invention has been described through its preferred embodiments, it is to be noted that these embodiments are not exclusive and various changes and modifications may be imparted thereto without departing from the scope of the invention which is limited solely by the appended claims.

We claim:

1. In a nuclear reactor core having a plurality of fuel units arranged in the central region of the reactor core and occupying more than 50% of the total area of the reactor core, each fuel unit including four adjacent fuel assemblies which adjacently surround one control rod, said fuel assemblies of each fuel unit being adapted to be replaced one by one at each of successive fuel replacement cycles, an improvement wherein each of said fuel units in the state of an initial core includes one poison-containing fuel assembly, and three other assemblies containing no poison and having mean enrichments lower than that of said poison-containing fuel assembly.

2. A construction of a nuclear reactor core as claimed in claim 1, wherein said fuel assemblies of said fuel unit containing no poison are replaced one by one at each fuel replacement cycle with a poison-containing replacement fuel assembly, the poison-containing replacement fuel assembly being constructed the same as said poison-containing fuel assembly of said initial core.

3. A construction of a nuclear reactor core as claimed in claim 1 or 2, wherein said three fuel assemblies containing no poison of each fuel unit includes a combination of at least one low enrichment fuel assembly and at least one medium enrichment fuel assembly.

4. A construction of a nuclear reactor core as claimed in claim 3, wherein said three fuel assemblies containing no poison of each fuel unit include one low enrichment fuel assembly and two medium enrichment fuel assemblies.

5. A construction of a nuclear reactor core as claimed in claim 4, wherein each of said fuel assemblies has an upper and lower portion, each of said medium enrichment fuel assemblies has a greater enrichment in the upper portion than in the lower portion thereof, said poison-containing fuel assembly has a greater poison content in the lower portion than in the upper portion thereof, and said poison-containing fuel assembly has a higher enrichment in the upper portion than in the lower portion thereof.

6. A construction of a nuclear reactor core as claimed in claim 5, wherein in each of said fuel units, said low enrichment fuel assembly is replaced with said poison-containing fuel assembly upon completion of the first cycle, one of said medium enrichment fuel assemblies is replaced with said poison-containing replacement fuel assembly upon completion of the second cycle, and the other of said medium enrichment fuel assemblies is replaced with said poison-containing replacement fuel assembly upon completion of the third cycle.

7. A construction of a nuclear reactor core as claimed in claim 1, wherein said poison-containing fuel assembly contains gadolinia as the poison.

* * * * *